United States Patent [19]
Patarcity et al.

[11] 3,953,006
[45] Apr. 27, 1976

[54] PORTABLE CONVERSION AND DISPENSING APPARATUS FOR CURABLE ELASTOMERIC COMPOUNDS

[75] Inventors: Adam J. Patarcity, Levittown; Daniel J. Smith, Washington Crossing, both of Pa.

[73] Assignee: Thiokol Corporation, Newtown, Pa.

[22] Filed: Aug. 9, 1974

[21] Appl. No.: 496,231

Related U.S. Application Data

[60] Continuation-in-part of Ser. No. 439,478, Feb. 4, 1974, which is a division of Ser. No. 315,710, Dec. 15, 1972, abandoned.

[52] U.S. Cl. .............................. 259/191; 425/87; 425/207
[51] Int. Cl.² .......................................... B29B 1/10
[58] Field of Search .......... 425/207, 208, 209, 376, 425/87; 264/139; 259/7, 8, 9, 10, 191

[56] References Cited
UNITED STATES PATENTS

| | | | |
|---|---|---|---|
| 1,747,300 | 2/1930 | Hildebrandt-Sorensen | 259/9 |
| 2,634,692 | 4/1953 | Sherbordy | 425/376 X |
| 2,813,302 | 11/1957 | Beck | 425/207 X |
| 2,944,286 | 7/1960 | Kullgren et al. | 425/376 X |
| 3,604,597 | 9/1971 | Pohl et al. | 425/378 X |
| 3,696,913 | 10/1972 | Anders | 259/191 X |
| 3,711,067 | 1/1973 | Kovacs | 425/207 X |
| 3,750,905 | 8/1973 | Wolfrom | 425/87 X |

FOREIGN PATENTS OR APPLICATIONS

| | | | |
|---|---|---|---|
| 665,158 | 6/1963 | Canada | 425/209 |
| 78,195 | 8/1933 | Sweden | 425/207 |
| 1,274,079 | 12/1968 | Germany | 259/191 |

*Primary Examiner*—Ronald J. Shore
*Attorney, Agent, or Firm*—Stanley A. Marcus; Thomas W. Brennan

[57] ABSTRACT

Elastomeric compositions of discrete parts of curable polymer and a curing agent are converted, by means of a portable, hand held conversion and dispensing apparatus, to a curable mass. The apparatus in a single compact package includes means for (1) receiving the uncured composition or article (2) breaking or fragmenting the composition (3) conveying the fragmented composition to a mixing zone (4) mixing the curable composition and (5) discharging or dispensing the mixed curable material into or on a substrate for in situ curing thereat. Also included is a power source and power transmission means wherein different rotational speeds and directions are obtained between the conveying and mixing means.

8 Claims, 6 Drawing Figures

PORTABLE CONVERSION AND DISPENSING APPARATUS FOR CURABLE ELASTOMERIC COMPOUNDS

CROSS REFERENCE TO RELATED APPLICATION(S)

This application is a continuation-in-part of application Ser. No. 439,478 filed Feb. 4, 1974 which application is a division of application Ser. No. 315,710 filed Dec. 15, 1972 and now abandoned, both applications in the name of Adam J. Patarcity and Daniel J. Smith.

BACKGROUND OF THE INVENTION

1. Field of the Invention

This invention relates to an apparatus for applying or installing curable materials into or on a substrate which, after installation, self-cure in situ. More particularly this invention relates to a hand held, powder driven dispensing device or application tool for converting materials of elastomeric content, which are multi-component compositions, preferably in the form of an integrated body of elongated tube, rope or tape-like structure of the discrete parts, into an in situ curable mass.

Excellent examples of the types of materials to be used and dispensed by the apparatus of the present invention are, in general, in a tube, strip, ribbon, cable or rope like form, substantially round in cross section and which, in a preferred embodiment, has an outer shell of uncured, though curable, polymeric material such as a polysulfide polymer containing suitable fillers and the like to give it body and solidity and being capable of extrusion through a suitable extrusion die selected for use for the purpose by skilled artisans and well known in the art. An inner shell is often used of a similarly constituted uncured polymer, and an inner core containing a curing agent, usually in liquid, slurry, or paste like is contained therein. This article is obtained by extrusion, as stated above in a process well known in the art of plastics manufacture and is exemplified and described in U.S. Pat. No. 3,440,309 and also in the 1963 issue of "Modern Plastics Encyclopedia" at pages 744 through 748 thereof, and many other patents and publications. In these uses the extruder by means of its appropriately designed die system can extrude, simutaneously, the double rolled rope, tube or cable-like article described above and fill the inner core of the inner shell with curing agent by means of a suitable metering device and injection nozzle incorporated therewith. The article when extruded is coiled up on a reel and supplied to sealant installers and is capable of being stored for extended periods prior to being converted to a curable polymeric system in a substrate such as for example, the frame of a windshield of an automobile body, or other applications in the construction, aircraft and marine industries to bond together or seal such substrates as, among others, metals, glass, concrete and wood. In the usual application it is desirable to have a curable substance to seal such substrates which will cure after being applied and yet can easily be handled. The subject of the present application is a portable, hand held, device, apparatus or application tool whereby the material discussed above is converted from a storable, curable composition of discrete parts including polymer and curing agent to a composition which is curable in situ after being fragmentized in the application tool and mixed therein in the same apparatus.

2. Description of the Prior Art

In U.S. Pat. No. 3,750,905 to Norman S. Wolfrom is disclosed a hand held thermoplastic sealant extrusion device wherein the material to be extruded and thereafter laid in the substrate is in the form of a heat meltable thermoplastic requiring no mixing. Accordingly in this patent the material is fed into one end of rotatable screw containing housing and conveyed to a nozzle, all the while being heated during its transport from the inlet to the nozzle and laid in a substrate. However, the device disclosed in this patent is the usual extrusion device wherein a heat meltable thermoplastic material is fed to a rotating screw through a heat zone and discharged through a nozzle, or orifice at the other end. The device disclosed is not suitable for handling materials such as is intended to be handled by the present apparatus.

Still another device similar to the one discussed above, is disclosed in U.S. Pat. No. 3,604,597 to H. E. Pohl, wherein the hand held, motorized apparatus receives a rod like material of thermoplastic substance and is fed to a heat zone for melting thereof and later extrusion onto a substrate. This device uses a pair of rollers to convey the heat meltable rod-like thermoplastic raw material to a heat zone where it is melted and later discharged through an orifice. This device, as is quite evident could not be readily adapted to handle materials of the type intended in the present invention.

Still another patent, U.S. Pat. No. 3,711,067 to L. Kovacs, discloses a rotating screw and tandemly attached mixing section for handling extrudable thermoplastic materials transporting the same to the tandemly attached mixer and mixing the same homogeneously. Heater means is also provided to melt the discharged product. While it is apparent that this device can receive, fragmentize, convey and convert materials of the type disclosed and intended by applicants for their device it cannot achieve the efficiency of mixing, nor the degree of homogeneity of mixture as will be evident from what follows in the discussion of the present invention.

SUMMARY OF THE INVENTION

Briefly described, the present invention is a portable, hand held sealant dispensing apparatus wherein a rope-like material of curable polymer, together with its curing agent in paste, liquid or slurry form, is inserted in the inlet of the device, fragmentized by a rotating screw and the fragments rotatably conveyed to a mixer for complete mixing of the curable polymer and the curing agent to result in a curable mass which can thereafter be discharged through a nozzle and laid in a substrate for sealing the same. The material discharged cures in situ in the substrate. The apparatus includes an outer housing, or barrel which contains the rotating screw, the housing being fitted with a specially formed inlet to receive the material to be dispensed. The screw is fixed in rotating relationship to a power source such as an electric or pneumatic motor, or any device which will effectively rotate the screw. Preferably, the screw is geared through a planetary gear power transmission system, although a reverted gear transmission system can be used such that the screw is rotated at a predetermined speed. The screw is hollow and inserted therethrough is a drive shaft also connected through the power transmission means to the power source for rotation thereby. The drive shaft extends through the center of the hollow screw and emerges from the other end where a mixer is rotatably affixed. The mixer is also contained within the housing near the discharge end thereof and a nozzle is affixed thereat for discharging the material. The use of a planetary or a reverted gear system power transmission permits contra rotation between the screw and the mixer which rotates in the opposite direction. As will be seen from what follows in the description of the preferred embodiment the ratio of drive shaft rotational speed to screw rotational speed imparts to the apparatus a unique capability of truly homogeneously mixing the curable polymer and curing components of the material to be discharged and laid into or on a substrate.

It is therefore an object of the present invention to provide an apparatus for installing in a substrate to seal the substrate, a curable, elastomeric mass, said mass being produced by fragmentizing, conveying and mixing together a multi-component integrated composition of discrete parts to convert the same to an in situ curable mass. It is another object of the present invention to provide the substrate sealing mass by means of a hand held, portable power driven feed screw and mixing device wherein the feed screw rotates in one direction at one speed (preferably lower) and the mixer is rotated by a drive shaft rotating in the opposite direction and at a higher speed to significantly improve mixing of the components, under greater control for discharge into or on a substrate.

DESCRIPTION OF THE PREFERRED EMBODIMENT

Figures 1, 2, 3:
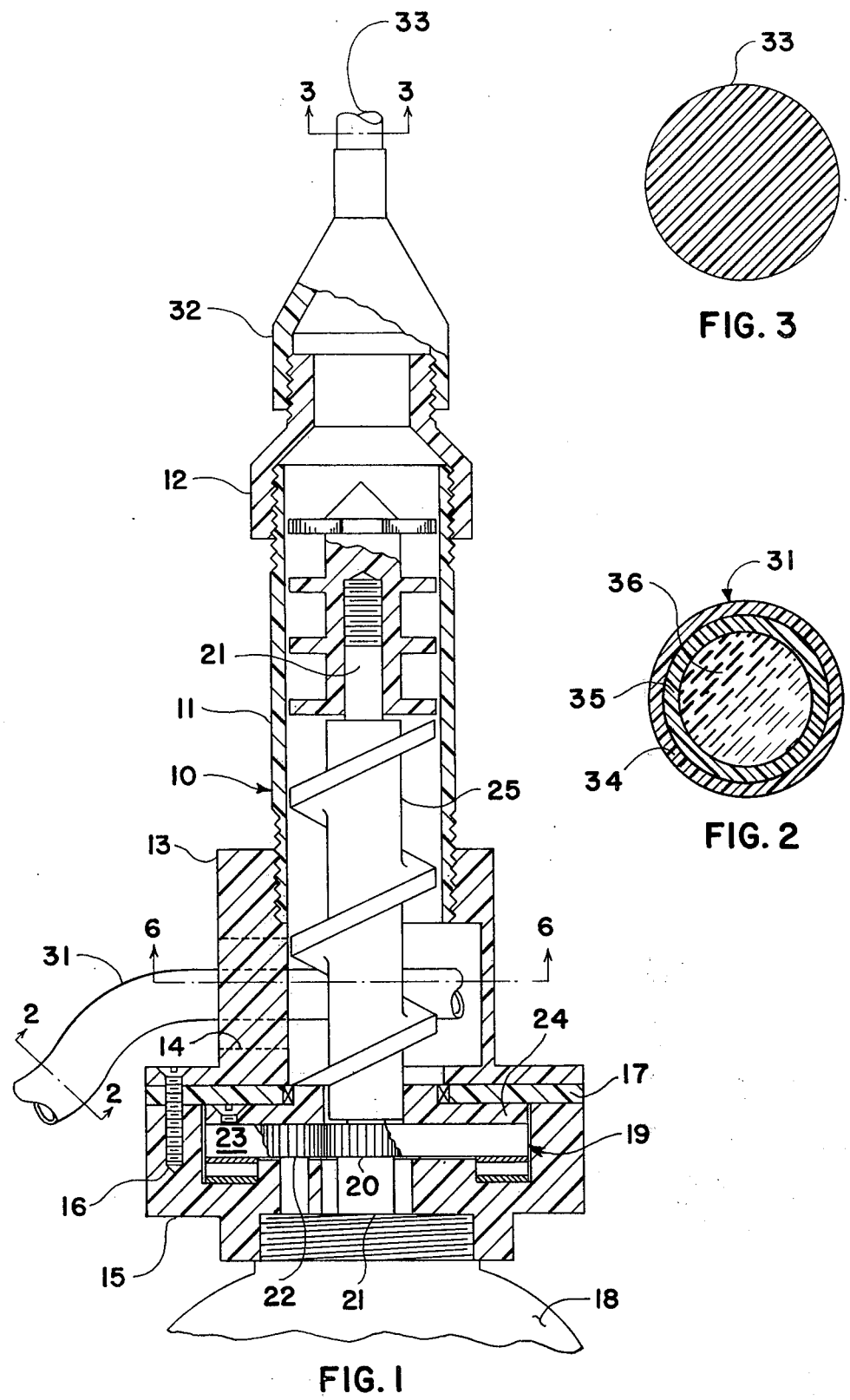
FIG. 1 is a longitudinal cross section of the hand held dispensing apparatus in accordance with the present invention.
FIG. 2 is a cross section taken along lines 2—2 of FIG. 1 and illustrates a form of elastomeric material handled by the invention.
FIG. 3 is a cross section taken along lines 3—3 of FIG. 1 showing the converted product as discharged from the invention.

Referring to the drawings, and in particular to FIG. 1, there is shown a preferred embodiment of the apparatus of the present invention in the form of an elastomeric composition dispensing device or dispenser 10. Dispenser 10 is a hand held, compact, light-weight, portable power tool comprising a tubular housing or barrel 11. An end or discharge cap 12 is threadably attached to one end of housing 11 and a throat plate 13, with an inlet or feed port opening 14 therein, threadably connected to the opposite end. Throat plate 13 is attached to a gear housing 15 by means of bolts or screws 16 through a gear cover 17. Gear housing 15 is threadably mounted on a power source 18 only the forward end thereof being shown. Power source 18 is any convenient rotating device such as an electric, pneumatic or hydraulic motor or the like.

Gear housing 15, in the preferred embodiment, contains a power transmission device in the form of a planetary gear train or system 19. Gear train 19 includes a central or sun gear 20 rotatably mounted on a drive shaft 21, one or more planet gears 22 (one shown) internal ring gear 23 and a drive plate 24. Drive shaft 21, as noted, rotatably carries sun gear 20 and at its left hand end in FIG. 1 is connected in rotating, power receiving, relationship to motive power source 18.

Figure 4:
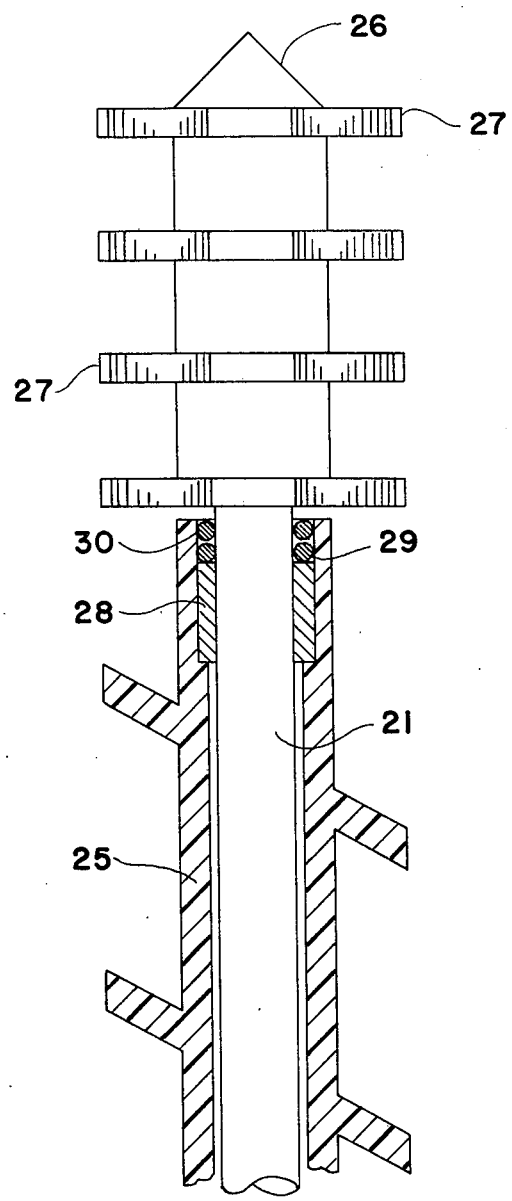
FIG. 4 is an enlarged view of the mixer and drive shaft portion of the apparatus of the invention, partially broken away, to show the hollow feed screw.
Figure 5:
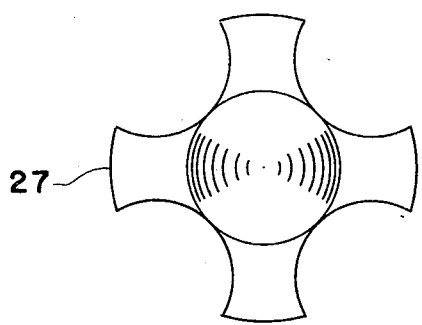
FIG. 5 is an end elevational view of a mixing blade of the mixer shown in FIG. 4.

A hollow, rotating, powered feed screw 25 is disposed in housing 11 and throat plate 13, and on its left hand end in FIG. 1 is mounted, for rotational relationship thereby, drive plate 24. As noted above, screw 25 is hollow and drive shaft 21 is positioned in the hollow, central space, its ends protruding at each end of screw 25. In FIG. 1, the right hand end of shaft 21 is threaded to receive in threaded and rotational engagement therewith a mixer 26. Mixer 26 comprises a plurality of mixing blades 27, (four shown). Screw 25 at mixer 26 end (FIG. 4) is formed with a recess to accomodate a bearing or bushing 28 for shaft 21 and O-ring seals 29 and 30.

Figure 6:
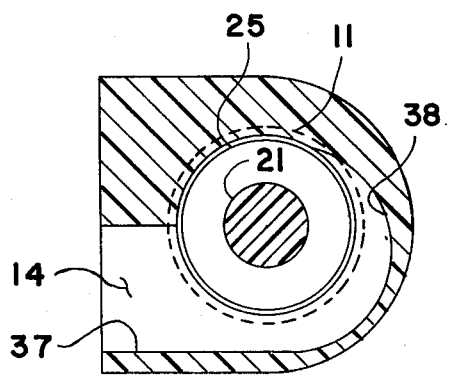
FIG. 6 is a cross section taken along lines 6—6 of FIG. 1.

Referring now to FIG. 6, throat plate 13 and feed port 14 therein are shown in cross section. Port 14 is formed in plate 13 so that its lower portion is tangentially cut or machined to facilitate entry of elastomer composition 31 and provide increase case of contact with screw 25. Also illustrated in FIG. 6 is the tight fitting, low clearance relationship of screw 25 to the internal surface of plate 13 (also, as seen in FIG. 1, with barrel 11).

Turning again to FIG. 1, barrel or housing 11 is threaded at both ends, as noted above, to receive plate 13 on the left and to receive, also in threaded engagement, end cap 12 at the right. Affixed to cap 12 is a discharge or dispensing nozzle 32, which for illustration purposes, is configured to dispense mixed, curable elastomeric mass or composition 33 (FIG. 3) in the form of a rounded strip or rod.

In FIG. 2 is illustrated a preferred, or three part, preformed elastomeric composition 31 to be mixed and dispensed by the invention and comprises an outer casing or shell of uncured elastomer 34, an inner elastomeric uncured casing or shell 35 and a liquid curing agent core 36 which, as is self evident, can be a slurry or of paste like consistency.

In operation of dispensing apparatus 10 of the present invention, a source of material such as rope, tape or cable 31 above described, or the like, which can be conveniently obtained from a reel (not shown) upon which it is rolled and which is positioned conveniently near by for ready use in the invention, is transported to feed port 14. In FIG. 1 a portion of elastomeric rope, tape, or cable 31 is shown at the entrance to barrel 11 and an initial fragment thereof is about to be cut therefrom by shearing action of one of the helicial blade flights of screw 25, as it approaches the forward, or right hand edge of feed port 14. Depending upon the speed ratio of shaft 21 to screw 25, which preferably is about 3 to 1, and the feed rate of elastomeric product 31, the rate of fragment production can be adjusted over relatively wide ranges as each respective blade flight of screw 25 passes the shearing edge in opening or feed port 14. The first and each succeeding fragment produced by shearing action of screw 25 is conveyed thereby toward the right hand end of barrel or housing 11 where the fragments enter a mixing zone and are contacted thereat by contra-rotating. higher speed mixer 26 which rotates with and at the same speed as shaft 21. Blade 27 or mixer 26 then thoroughly masticate and homogeneously mix product 31, converting it to curable mass or sealant 33. Elastomeric mass 33 is then pumped through end cap 12 into nozzle 32 and discharged into or on a substrate (not shown) for sealing the same upon finally curing, in situ, thereat.

As mentioned above, rope, tape or tube 31 while preferably in the form illustrated, being an elastomeric curable polymer such as described above and comprising an outer shell or casing 34 of a curable polymer substance, can be virtually any synthetic polymer or natural rubber which is known to self cure at normal room temperature when brought in contact with the necessary curing agent. Examples of such substances, or polymers, are polysulfide polymer, acrylic type polymers and copolymers, butadiene polymers and copolymers, polyesters, polyepoxides, silicone polymers, polyurethanes, ethylene propylene, copolymers and terpolymers, neoprene and natural rubbers as well as others which will occur to the skilled artisan.

Again, referring to FIG. 2 there the preferred type of article, as described, is rope or tube 31 and comprises outer casing or shell 34, inner casing or shell 35, and in addition to the polymer which forms the polymer basis of casings 34 and 35, the composition thereof may also include various fillers and special purpose additives well known in the sealant art, for example, carbon black, calcium carbonate, ultraviolet absorbers, fibers, plasticizers, adhesive additives and the like. Where a liquid polymer, e.g., a liquid polysulfide polymer, forms the basis of casings 34 and 35, sufficient quantities of fillers and other special purpose additives can be utilized to produce a substantially solid, semi-solid or putty-like mass so as to be extrudable, a most frequently used method for manufacturing casings 34 and 35. Thus product 31 is a three component i.e., three part package in strip, tube or rope form with inner casing 35 also formed of the same or similar materials to casing 34 and, extruded in a similar manner, preferably simutaneously and concentered with, outer casing shell 34 and, also preferably simultaneously, a core 36 of a curing agent, usually a liquid or slurry or of paste like consistency is formed by suitable injection means (not shown). The finished article 31 is thus a one-package, curable, polymeric composition of three discrete components which can be stored over long periods of time and over a wide temperature ranges without undergoing any deleterious effects, such as premature self-curing, since and until all of the components are fragmentized and intimately admixed as by means of the present invention, no cure or only surface cure, will take place since the curing agent will cure the inner surface of the inner casing 35 and further migration through the casing will not take place.

As can be seen from FIG. 6, rope or tube 31 is fed into port 14 between a side wall 37 in throat plate 13 and contacts the flights of screw 25 tangentially by virture of specially formed throat 38 in plate 13. Screw 25 carries rope 31 forwardly, shears off fragments against the forward edge of port 14 and conveys them to mixer 26 which thoroughly mixes them to a homogeneous mass of curable polymer 33.

Therefore what has been described and presented to the art of sealant application, and other polymeric compounds, is a means for rapidly and inexpensively forming a curable sealant mass to be accurately and smoothly laid into or on a substrate from a one-package curable elastomeric composition. It should be understood, of course, that other substrates such as seams in boats, windows and other sites well known to the art can be sealed by the present invention in a most economic and efficient manner.

It should further be understood that the form of material or article which can be processed in the present integrated, continuously operable, shearing, conveying and mixing dispensing apparatus 10 of light weight construction, portable and easily held in the hands can be a two-part, or two component, or multi-component system wherein outer casing 34 is extruded and contains the curing agent core 36, omitting inner casing 35. Certain types of sealing problems will be most effectively sealed by such a system. Other polymer system can also be used, e.g., a single solid tape or strip can be fed to feed port 14 and the curing agent therefor separately injected simultaneously thereat to be conveyed to mixer 26 by screw 25, intermixed thereby and discharged in a similar manner for placement into or on a substrate for sealing purposes. In addition, a solid and/or liquid material system can also be used with suitable modification of feed port 14 to adapt the same to receive such materials. Further, powdered resins and the like, with the curing agent separately fed or premixed therewith can be conveyed and discharged in the form shown in FIG. 1 as in situ curable sealant 33. If the resin or polymer system is such that heating is required, it should be readily understood that, without departing from the scope of the present invention, suitable heating means can relatively easily be added to dispenser 10 to accommodate such systems, and these are therefor contemplated.

It should also be understood that other power transmission systems can be utilized besides planetary gear train 19 shown, and such is contemplated as within the scope of the present invention. For example, a reverted gear train system (not shown) can be easily accommodated without departing from the scope of the invention in any significant way. Such systems have the probable disadvantage of increased weight and tend to require much greater space thereby resulting in a larger overall "package" or envelope than the preferred planetary gear system 19. However, comparable speed ratios of drive shaft to screw can be achieved. Other gear trains such as an epicyclic gear train, a special form of reverted gear train, can also be used. In addition, other forms of power sources can also be used, the preferred one being a relatively simple electric motor. Power means such as a pneumatic motor, already mentioned, various hydraulic devices well known and even a manually operated crank system can achieve the result desired and are well within the purview hereof.

What has therefore been disclosed and described and for which Letters Patent of the United States is desired is a hand held, portable machine or apparatus, application gun or tool for installing a curable article or sealant in situ, which article, prior to installation, is a polymeric system of at least one discrete, uncured polymer composition and an additional discrete component of a curing agent therefor which components are fed to opening or feed port 14 of dispenser 10 in any convenient manner well known to the art, fragmentized thereat, preferably near the entrance thereof, and the fragments conveyed to a mixing zone and thereafter intimately admixed and finally discharged into or on a substrate for sealing therein. It should be noted that some pre-mixing also occurs in screw 25 while the fragments are being conveyed to the mixing zone. This it can be seen that the present invention is a new combination of a sealant dispensing device, which, by the unique arrangement of a relatively high speed mixer rotating in one direction, and a screw rotating at slower speed in the opposite direction, results in more efficient, economic and efficacious application of sealants adhesives and like materials into or on a substrate. There is present therefore a genuine advancement of the art of sealants and dispensing apparatuses therefor, for applying or installing a single or multi-package, uncured, single or multi-component polymeric composition of curable polymers and the curing agent therefor, converting the same to a cured or curable sealant and dispensing into or on a substrate for sealing purposes whereafter the curable mass so obtained seals and cures in situ.

What is claimed is:

1. A portable, hand held dispensing device for installing an in situ curable, elastomeric composition for sealing substrates and the like, wherein said composition prior to installation, comprises at least one discrete, uncured polymeric composition and at least one discrete curing agent therefor, comprising, in combination:
   a. an elongated housing comprising a barrel, a throat plate having an intake opening to receive said curable elastomeric composition, and a dispensing end oppositely disposed from said throat plate, means defining a vertical side wall extending from said opening to the bottom of said housing and terminating on the opposite side thereof;
   b. a hollow, rotatable screw in said housing, one end of said screw communicating with said intake opening and adapted to receive said curable composition, fragment the same and convey said fragments toward said dispensing end of said housing;
   c. a drive shaft in said housing in said hollow screw, the ends of said shaft extending from a respective end of said screw;
   d. at least one mixing blade on one of said extending ends of said shaft rotatably mounted on said shaft and positioned in line with and adjacent the end of said screw opposite said intake opening for mixing said fragmented composition;
   e. a dispensing nozzle on said housing on said dispensing end thereof adapted to receive said mixed composition and dispense the same into or on a substrate for in situ curing to seal said substrate;
   f. single power means for rotating said shaft and said screw; and,
   g. power transmission means operatively connect to said drive shaft, said screw and said power means whereby said screw and said shaft are rotated at different speeds and directions.

2. The dispensing device of claim 1 wherein said power means is an electric motor.

3. The dispensing device of claim 1 wherein said power means is an pneumatic motor.

4. The dispensing device of claim 1 wherein the power transmission means is a planetary gear system.

5. The dispensing device of claim 1 wherein the power transmission means is a reverted gear system.

6. The dispensing device of claim 1 wherein the power transmission means is selected to provide a shaft to screw speed ratio of 3 to 1.

7. The dispensing device of claim 1 wherein the termination of said side wall is tangential to the outer periphery of said screw.

8. The dispensing device of claim 1 wherein said throat plate intake opening and said side wall extending therefrom define a convoluted passage in said plate for facilitating feeding of said curable composition.

* * * * *